Figure 1:
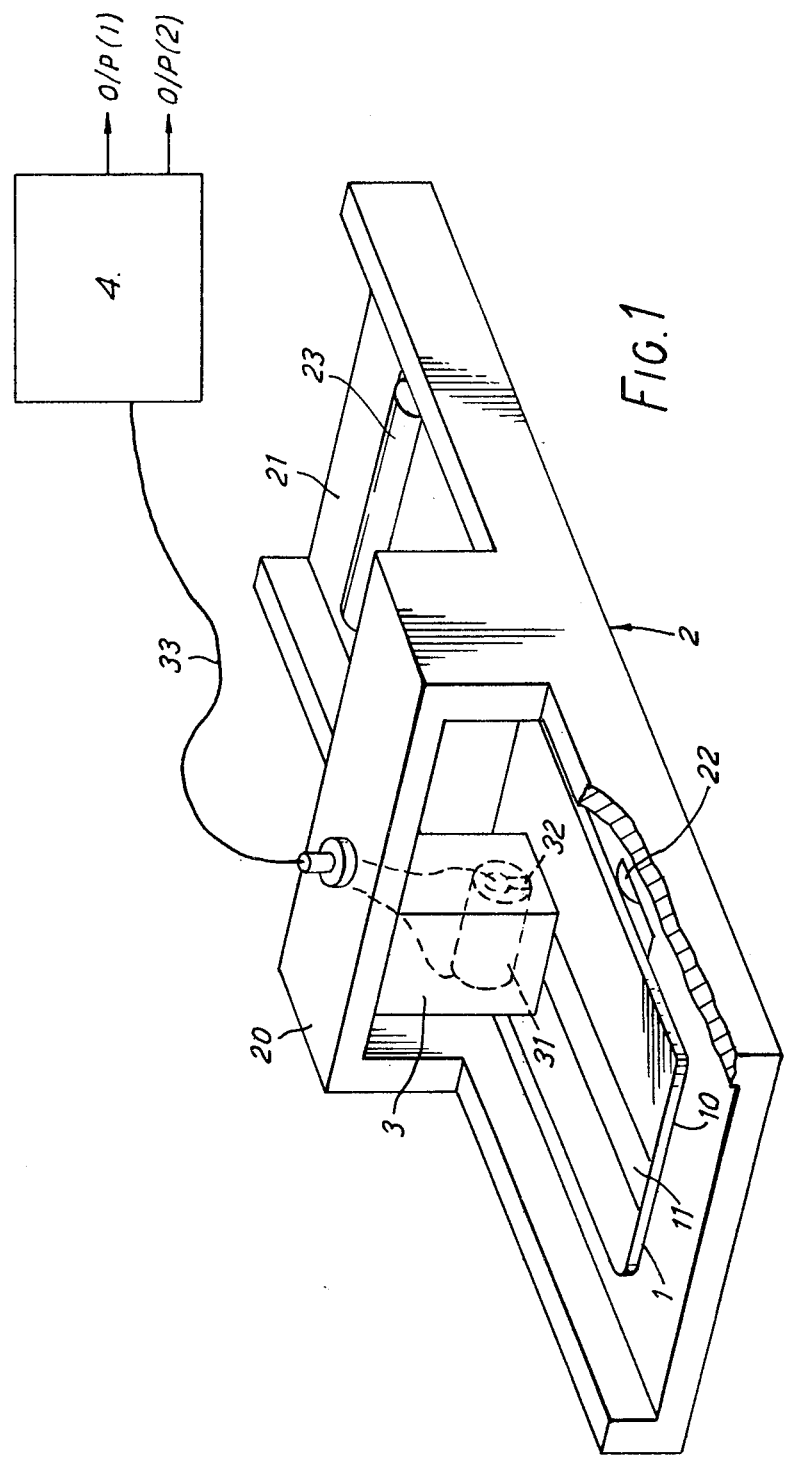

United States Patent [19]
Way

[11] 4,328,519
[45] May 4, 1982

[54] READING SECURE MAGNETIC DOCUMENTS

[75] Inventor: Lewis J. Way, Sunninghill, United Kingdom

[73] Assignee: E M I Limited, Hayes, England

[21] Appl. No.: 88,148

[22] Filed: Oct. 25, 1979

[30] Foreign Application Priority Data

Nov. 11, 1978 [GB] United Kingdom ............... 44183/78

[51] Int. Cl.³ .......................... G11B 5/02; G11B 5/12
[52] U.S. Cl. ..................................... 360/67; 360/110; 360/117
[58] Field of Search ..................... 360/2, 67, 110, 117, 360/66; 235/450, 493

[56] References Cited

U.S. PATENT DOCUMENTS

| | | | |
|---|---|---|---|
| 3,027,549 | 3/1962 | Allen, Jr. | 360/67 |
| 3,312,372 | 4/1967 | Cooper, Jr. | 235/450 |
| 3,435,443 | 3/1969 | Muir | 360/66 |
| 4,029,945 | 6/1977 | Yamada et al. | 235/450 |
| 4,108,366 | 8/1978 | Genest et al. | 235/450 |

*Primary Examiner*—Vincent P. Canney
*Attorney, Agent, or Firm*—Fleit & Jacobson

[57] ABSTRACT

An apparatus for reading magnetic documents, comprising an inductively wound gapped core forming part of a tuned circuit which is driven at its resonant frequency, and a means for producing an output signal indicative of the quality factor of the tuned circuit.

9 Claims, 3 Drawing Figures

READING SECURE MAGNETIC DOCUMENTS

This invention relates to the reading of secure magnetic records.

The increasing use of security cards or documents, having magnetically recorded information has led to the introduction of increasingly sophisticated techniques to prevent their fraudulent misuse. In one example coded information may be recorded in a layer of anisotropic magnetic particles, gamma ferric oxide for example, in the form of a permanent magnetic structure.

By a permanent magnetic structure we mean that in selected spaced regions of the layer the anisotropic magnetic particles are fixedly aligned along a predetermined direction and the particles in the remainder of the layer are not so aligned or are aligned along a substantially different direction, the pattern formed by the variation of alignement thereby permanently representing the coded information. Such a permanently structured material, sometimes referred to as a magnetically 'watermarked' material, is described, for example, in U.K. Patent Specification No. 1,331,604.

Hitherto it has been common to detect the information recorded in this manner by magnetising (or 'developing' as it is sometimes called) the layer using a unidirectional field, and using a pick-up head to link with the resulting flux in the layer. In practice however, such a 'developing' field is conveniently of such a magnitude as to saturate the magnetic material and thus may effectively destroy erasibly recorded information also present on the security card. Furthermore good head-to-record contact is often difficult to achieve with the closely spaced 'development' and reading heads often preferred in compact arrangements.

U.S. Pat. No. 2,875,429 describes a means for detecting magnetic bodies wherein a gapped inductive circuit forms part of a driven resonant circuit and responds to the presence of a magnetic body at the gap, since this causes a change in the reluctance presented, thereby causing a change in the inductance of the circuit. Such a change in inductance may be detectable as a departure of the resonant frequency of the circuit from the driving frequency, or equivalently as a change in the phase relation between the current and the energising signal. An inductance sensitive arrangement of this type is inevitably sensitive to a variation in the thickness of a presented material and also to separation of the core gap therefrom.

It is an object of the present invention to provide an improved form of detection means which uses pick-up means which does not require a separate developing head and which is relatively insensitive to variations of thickness and separation.

According to the invention there is provided a magnetic reading apparatus for generating electrical signals indicative of information recorded in a magnetic track as a variation of a magnetic property therealong, the apparatus comprising, a gapped magnetic core,
a series tuned circuit including a coil wound upon said core for sensing material in said track disposed in the vicinity of the core gap,
means for causing the tuned circuit to oscillate always at a fixed resonant frequency of the circuit as the material in said track is sensed and output means comprising amplifier means, responsive to pulses substantially coincident with the peaks of oscillations generated by the tuned circuit, to sample the amplitude of said oscillations and a capacitor store and voltage follower for cooperating with said amplifier means to generate an output signal representing the envelope of signals generated by the tuned circuit, a variation in the amplitude of said output signal as the track is sensed being indicative of a variation of magnetic property of material along the track and the information recorded therein.

Such an arrangement does not require a separate 'developing' field and provides an output signal independent of the rate at which the recorded information is read. It is a further attractive feature of this arrangement that compared with the inductance sensitive arrangement, described earlier, the output is found to be less sensitive to variation in sample thickness and separation.

It may be convenient to provide an output signal, proportional to the quality factor, representing the envelope of the tuned circuit output. Preferably this may be achieved using an output means containing a sample and hold circuit, thereby providing a means to periodically sample the output of the tuned circuit, and a capacitor store and a voltage follower cooperating with the sampling means to produce an output signal representative of the envelope of said tuned circuit output signal.

The sampling means may be a gain gated operational amplifier, or an analogue switch.

The amplifier may be activated by pulses arranged to be coincident with the peaks of the tuned circuit output signal. This may be conveniently achieved by deriving the pulses from the output of the oscillator means used to drive the tuned circuit, by differentiating and shaping the square wave output therefrom.

The width of each pulse should preferably be sufficiently narrow to permit sampling of only a substantially constant part of the peak amplitude. A pulse width of between 3 and 15 percent of a cycle of the tuned circuit output is found to be suitable.

Although difficult in practice, it is possible in theory to simulate a 'watermark' by suitably structuring the thickness, rather than the alignment, of the magnetic material. As mentioned above the present invention is relatively insensitive to variations of thickness and for all normal purposes this is desirable. However, if a fraudulent simulation is suspected this may be readily detected by adapting the output means to be responsive also to provide a signal dependent upon the resonant frequency of the tuned circuit. Such a detection means may, therefore, be used to provide an initial verification of a genuine 'watermark' before reading the information encoded therein using the quality factor detection method of this invention.

Such frequency measurement may be accomplished using a frequency demodulator.

The arrangement may include an input means arranged to guide a support member, bearing magnetic material, on a path adjacent to the core gap to thereby permit the magnetic flux lines across the gap to intersect the magnetic material.

The magnetic core may be arranged so that the flux lines lie in a plane substantially parallel with a plane of alignment of magnetic particles on a guided support.

The core may also be arranged so that the flux lines across the core gap lie substantially along an alignment direction of magnetic particles on a guided support.

The input means may include a transport means operable to provide relative motion of a presented support member and a core gap.

The arrangement may include a further gapped magnetic core and associated circuitry the two gaps being arranged to lie in substantially different directions. The two directions may be orthogonal and may lie substantially along an alignment direction of magnetic particles on a guided support. The output from two such orthogonal gaps should be in antiphase thereby providing further verification that the magnetic material is genuinely watermarked.

Figure 2:
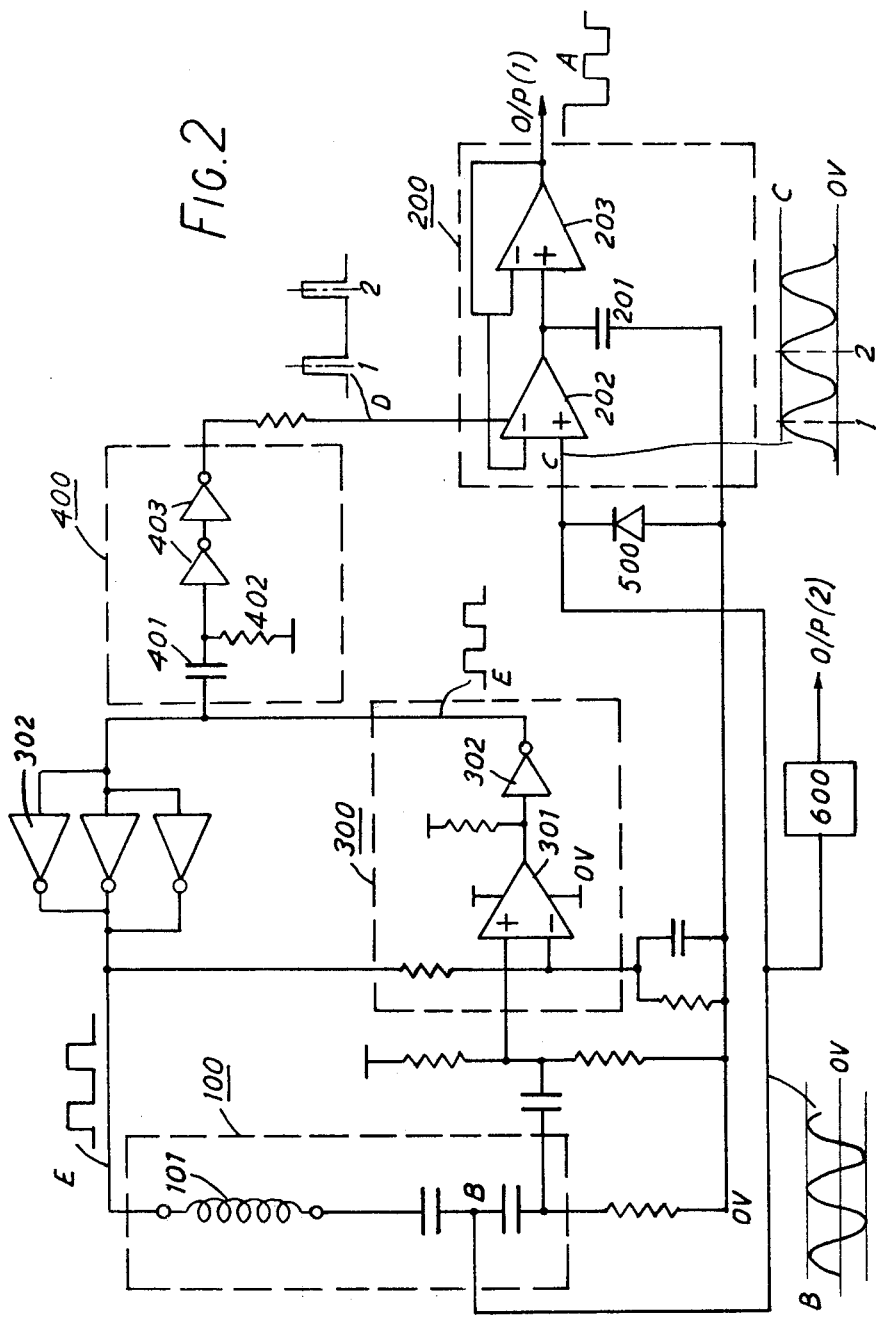
Figure 3:
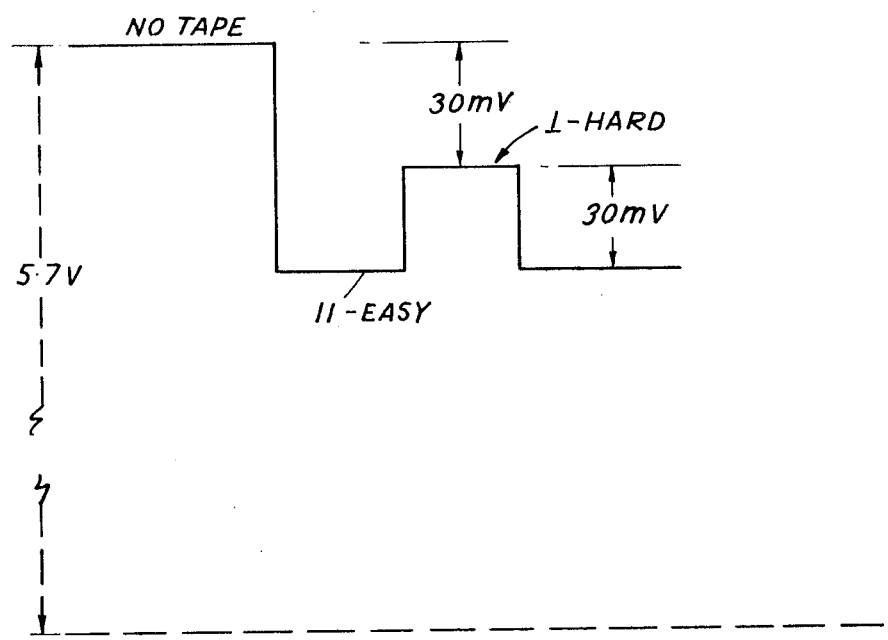

To enable a better understanding of the invention an embodiment, by way of example thereof, will be described with reference to the accompanying drawings in which, FIG. 1 shows a secure magnetic record reading arrangement, FIG. 2 shows the output means for such a reading arrangement and FIG. 3 shows a typical output signal.

Referring to FIG. 1, a security document or card, 1, comprising, for example, a permanently structured magnetisable material track, 11, on a support member, 10, may be introduced into the reading arrangement, 2, via guide channel 21. The card may be driven by rollers 22, 23, for example, and suitable pressure pads (not shown) may be provided to urge the card, 10, against the rollers. In another embodiment the drive means may be absent, the card being introduced by hand into the reading arrangement.

A pickup head, 3, is mounted on a bridge, 20, over channel, 21, to thereby bear on the permanently structured track, 11. The head, 3, comprises a gapped magnetic core, 31, of PERMALLOY (RTM) or of ferrite having an inductive winding forming part of a tuned circuit. The core gap, 32, is aligned so that the flux lines across it lie in an expected orientation direction of the structured magnetisable material; along the stripe in the illustrated embodiment. In another embodiment a further head may be included having flux lines aligned along another orientation direction, for example across the stripe. Clearly, however, other orientation directions are possible.

The pickup head, 3, is connected to the output means (shown schematically at 4 in FIG. 1) by a suitable connector 33. The output means is illustrated in detail in FIG. 2. Referring to FIG. 2 of the drawings, the inductive winding on the gapped core is represented by, 101, and forms part of a series tuned circuit indicated by block, 100. This circuit is driven at its resonant frequency by a square wave signal shown at E generated by oscillator circuit, 300, comprising a comparator, 301, and a series of inverter/buffers, 302, arranged to ensure continuity of phase around the circuit. The sinusoidal output signal of the tuned circuit, illustrated at B, is clamped to the zero volts rail using a diode, 500, and the resulting signal is illustrated at C. The amplitude of this signal, proportional to the quality factor of the tuned circuit, is sensed by means of a sample and hold circuit, 200, wherein a differential amplifier, 202, activated to sample the peak amplitudes of the signal at C (at positions 1 and 2 for example) cooperates with a capacitor, 201, and a voltage follower, 203, to provide a level signal representative of the height of the last sampled peak. Should the amplitude of the signal at B (and therefore also C) change, due to a variation in the alignment of magnetic particles at the core gap for example, the level of the observed output signal, A, at O/P(1), also shifts accordingly. The differential amplifier, 202, used to sample the tuned circuit output signal is activated by a series of rectangular pulses, indicated at D, arranged to be coincident with the peaks of the input signal at C (centred for example on positions corresponding to 1 and 2 at C). These pulses are derived from the square wave output, indicated at E, of the oscillator circuit, 300, and are sufficiently narrow to only allow sampling of a substantially constant part of the tuned circuit output signal. This is achieved using the differentiating and shaping circuitry shown at 400. A pulse width of between 3 and 15% of a cycle of the tuned circuit output signal is found to be adequate. The components of the series tuned circuit produce an output signal typically of about 20–60 KHz and a suitably compatible pulse width would be between 0.5 and 8 microsecs.

The circuit, may also include a frequency demodulator circuit, 600, operable to produce a further output signal, at O/P(2), dependent upon the resonant frequency of the tuned circuit.

FIG. 3 shows a typical output signal observed at O/P(1), derived using a resonant frequency of 33 KHz, a head current of 18 mA, and a core gap of 0.002". The three levels indicated, show the observed signal in the absence of magnetic material, and the signals observed when the material is aligned along the easy ($\|$-parallel alignment) and hard ($\perp$-traverse alignment) directions. A much greater separation of the head and material can be tolerated using the amplitude detection method compared with the frequency detection method; a much reduced output signal being produced at a separation of 0.002" compared with 0.001" using the frequency detection method, for a pulse packing density of around 50 flux reversals per inch.

The described arrangement, which includes means to detect both the amplitude (proportional to the quality factor) and the resonant frequency of a tuned circuit, and incorporates a magnetic circuit, permits the recovery of information securely recorded, for example, as a permanent magnetic structure whilst rendering spurious or fraudulent readouts detectable. In particular an attempt to simulate a secure record using a high coercivity erasible record, or a thickness variation, can be detected.

It will be appreciated that the magnetic reader of the present invention is not limited to use with secure documents having a permanent magnetic structure, as hereinbefore defined, but may be used with other documents which affect the quality factor of the tuned circuit.

The reader may also be used, therefore, to read documents having a discontinuous magnetic bar code, or formed of a magnetic film which is structured into regions of high and low coercivity as described, in our copending British Application No. 20395/77.

What I claim is:

1. A magnetic reading apparatus for generating electrical signals indicative of information recorded in a magnetic track as a variation of a magnetic property therealong, the apparatus comprising,
    a gapped magnetic core,
    a series tuned circuit including a coil wound upon said core for sensing material in said track disposed in the vicinity of the core gap,
    means for causing the tuned circuit to oscillate always at a fixed resonant frequency of the circuit as the material in said track is sensed and output means comprising amplifier means, responsive to pulses substantially coincident with the peaks of oscillations generated by the tuned circuit, to sample the amplitude of said oscillations and a capacitor store and voltage follower for cooperating with said amplifier means to generate an output signal representing the envelope of signals generated by the tuned circuit, a variation in the amplitude of said output signal as the track is sensed being indicative of a variation of magnetic property of material along the track and the information recorded therein.

2. A magnetic reading apparatus according to claim 1 wherein said pulses are derived from the oscillator means by differentiating and shaping the output therefrom.

3. A magnetic reading apparatus according to claim 2 wherein the width of each pulse lies between 3 and 15% of the period of oscillations generated by the tuned circuit.

4. A magnetic reading apparatus according to any one of claims 1, 2 or 3 wherein the output means also comprises means for generating a further output signal indicative of the resonant frequency of the tuned circuit.

5. A magnetic reading apparatus according to claim 4 wherein the means for generating said further output signal is a frequency demodulator.

6. A magnetic reading apparatus according to any one of claims 1, 2 or 3 including an output means arranged to guide a support member bearing said magnetic material along a path adjacent to the said core gap to thereby permit the magnetic flux lines across the gap to intersect said magnetic material.

7. A magnetic reading apparatus according to claim 6 wherein the gap lies in a plane substantially parallel with the plane of alignment of magnetic particles on a guided support member.

8. A magnetic reading apparatus according to claim 6 including a further gapped magnetic core and an associated circuit, the core gaps being arranged to lie in substantially different directions.

9. A magnetic reading apparatus according to claim 8 wherein each core gap lies substantially along an alignment direction of the magnetic material in said track.

* * * * *